(12) United States Patent
Satou et al.

(10) Patent No.: US 8,497,937 B2
(45) Date of Patent: Jul. 30, 2013

(54) CONVERTING DEVICE AND CONVERTING METHOD OF VIDEO SIGNALS

(75) Inventors: Teruyuki Satou, Kawasaki (JP); Hideki Matsuoka, Kawasaki (JP); Ritsuko Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1539 days.

(21) Appl. No.: 11/787,979

(22) Filed: Apr. 18, 2007

(65) Prior Publication Data

US 2007/0252894 A1 Nov. 1, 2007

(30) Foreign Application Priority Data

Apr. 27, 2006 (JP) .................. 2006-123457

(51) Int. Cl.
*H04N 7/01* (2006.01)
(52) U.S. Cl.
USPC .......................... 348/441; 348/458; 348/459
(58) Field of Classification Search
None
See application file for complete search history.

(56) References Cited

U.S. PATENT DOCUMENTS

| | | | | |
|---|---|---|---|---|
| 5,708,474 | A * | 1/1998 | Hong | 348/448 |
| 6,108,041 | A | 8/2000 | Faroudja et al. | |
| 6,327,391 | B1 * | 12/2001 | Ohnishi et al. | 382/236 |
| 7,075,581 | B1 * | 7/2006 | Ozgen et al. | 348/448 |
| 7,324,157 | B2 | 1/2008 | Kuroda et al. | |
| 2002/0093587 | A1 * | 7/2002 | Michel | 348/452 |
| 2006/0044467 | A1 * | 3/2006 | Lee et al. | 348/441 |

FOREIGN PATENT DOCUMENTS

| | | |
|---|---|---|
| JP | 2001-506112 | 5/2001 |
| JP | 2004-165883 | 6/2004 |
| JP | 2005-102191 | 4/2005 |
| WO | 99/20046 | 4/1999 |

OTHER PUBLICATIONS

Notice of Reason for Rejection dated Feb. 22, 2011, from corresponding Japanese Application No. 2006-123457.

* cited by examiner

*Primary Examiner* — Jeffrey Harold
*Assistant Examiner* — Michael Teitelbaum
(74) *Attorney, Agent, or Firm* — Katten Muchin Rosenman LLP (57) ABSTRACT

To enable a progressive synthesization process suited to each video signal even in such a case that a difference between video signals based on a video transmission sequence and the video signals not based on the video transmission sequence, is fuzzy. A converting device according to the present invention detects as to whether a result of evaluation about whether or not inputted interlaced video signals are video signals based on a video transmission sequence meets a first standard and a second standard or not, converts the interlaced video signals into progressive video signals on the basis of the video transmission sequence when detecting that the interlaced signals meet the first standard, converts the interlaced video signals into the progressive video signals on a pixel selective basis when detecting that the interlaced signals do not meet the first standard but meet the second standard, and converts the interlaced signals into the progressive video signals on a pixel interpolative basis when the interlaced signals meet neither the first standard nor the second standard.

10 Claims, 7 Drawing Sheets

FIG. 1

RELATED ART

CONVERTING DEVICE AND CONVERTING METHOD OF VIDEO SIGNALS

BACKGROUND OF THE INVENTION

The present invention relates to an interlaced progressive conversion (which will hereinafter be abbreviated to a de-interlace process) technology used when displaying a picture transmitted as carried on interlaced signals based on NTSC (National Television Standards Committee) and PAL (Phase Alternating Line) with a non-interlaced receiver typified by a plasma display and a liquid crystal display.

The de-interlace process has hitherto employed a motion adaptive technology and a motion compensated technology, which detect a motion of the picture and generate interpolation pixels based on this motion. These technologies are based on a premise that in the case of, e.g., NTSC signals, an original picture is an interlaced picture having a time resolution for every 1/60 sec (which will hereinafter also be referred to as 60i (60 frames/s interlace)).

On the other hand, the picture using a [frame] such as a film material of a movie and animation and a CG (Computer Graphic) material generated by a computer, is subjected to so-called telecine conversion involving 2:3 pulldown and 2:2 pulldown and is thus transmitted as carried on interlaced video signals. For instance, if the signals are video signals for transmitting the progressive picture (frames) at a framerate of 24 fps, one frame is allocated into 2 or 3 fields by the 2:3 pulldown. Further, if the signals are video signals for transmitting the progressive picture (frames) at a framerate of 30 fps, one frame is allocated into 2 fields by the 2:2 pulldown.

When the telecine-converted video signals are processed by the interpolation technology such as the motion adaptive technology and the motion compensated technology, lines in the frame where none of the video signal exists are compensated by interpolation data, resulting in occurrence of a problem such as flicker, jaggy and artifact.

As to the telecine-converted videos signals, if a video transmission sequence such as the 2:3 pulldown sequence and the 2:2 pulldown sequence is simply known, the original progressive picture can be restored from the segmented fields.

Figure 1:
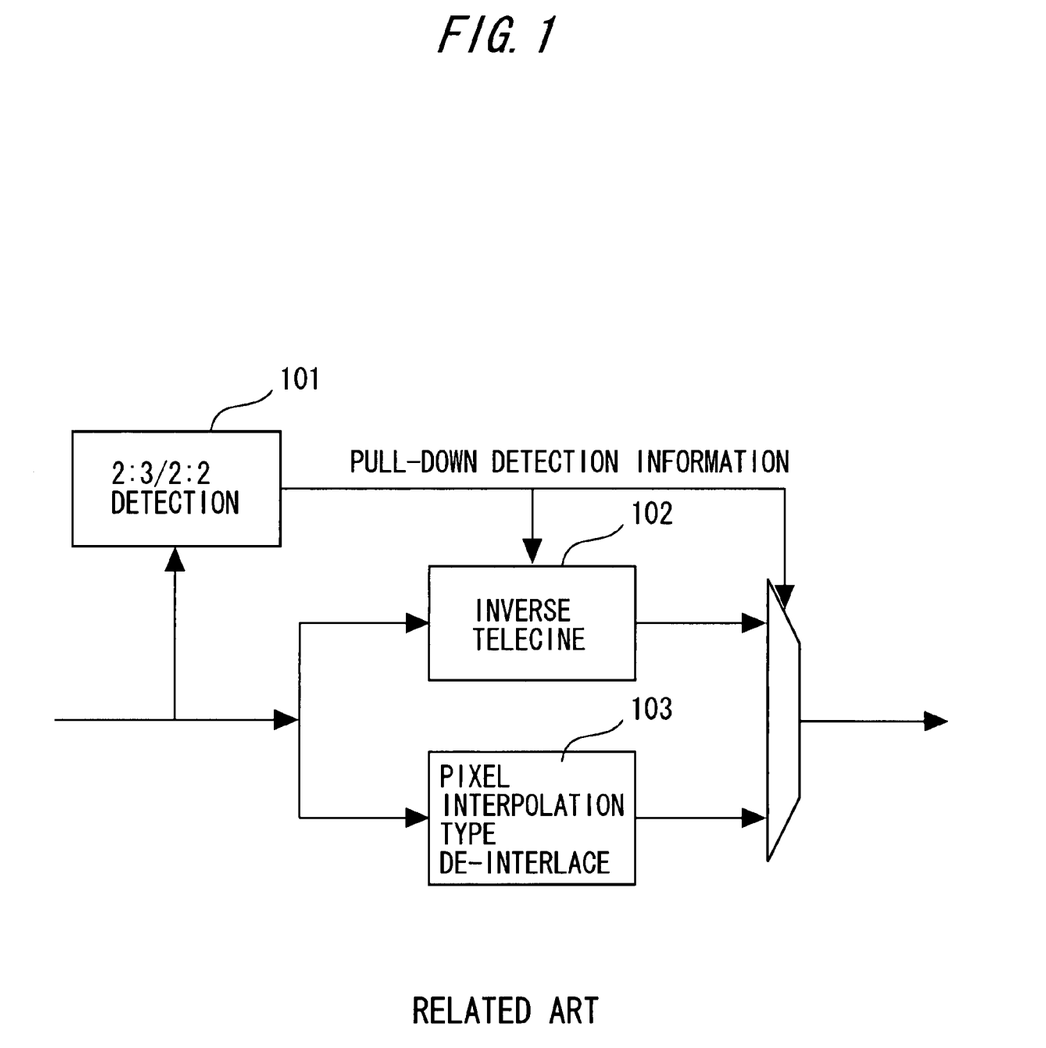
FIG. 1 is an explanatory diagram of a related technology.

Hence, there is proposed a converting device that judges whether or not the inputted video signals are the telecine-converted signals, and executes a converting process corresponding to a result of this judgment. FIG. 1 is a schematic diagram of the converting device including a sequence detecting unit 101, a inverse telecine unit 102, and a motion-compensated type de-interlacing unit 103.

The sequence detecting unit 101 compares the respective fields of the inputted video signals, and thus detects the video transmission sequence such as the 2:3 pulldown sequence and 2:2 pulldown sequence or a sequence other than these sequences. If the video information is of the 2:3 or 2:2 pulldown video transmission sequence, the sequence detecting unit 101 notifies the inverse telecine unit 102 of the video transmission sequence, wherein the de-interlace process based on the video transmission sequence is conducted, and the video signals are thus outputted.

Then, the sequence detecting unit 101, when judging that the inputted video information is not of the 2:3 or 2:2 pulldown video transmission sequence, selects and outputs the signals by the de-interlacing unit 103 on the basis of the interpolation technology such as the motion adaptive technology and the motion-compensated technology.

Further, a technology disclosed in, e.g., the following Patent document 1 is given as the prior art related to the invention of the present application.

[Patent document 1] Japanese Patent Application Laid-Open Publication No. 2005-102191

SUMMARY OF THE INVENTION

As described above, it was of importance to detect the video transmission sequence in order to attain a high quality of the de-interlaced picture.

Figure 2:
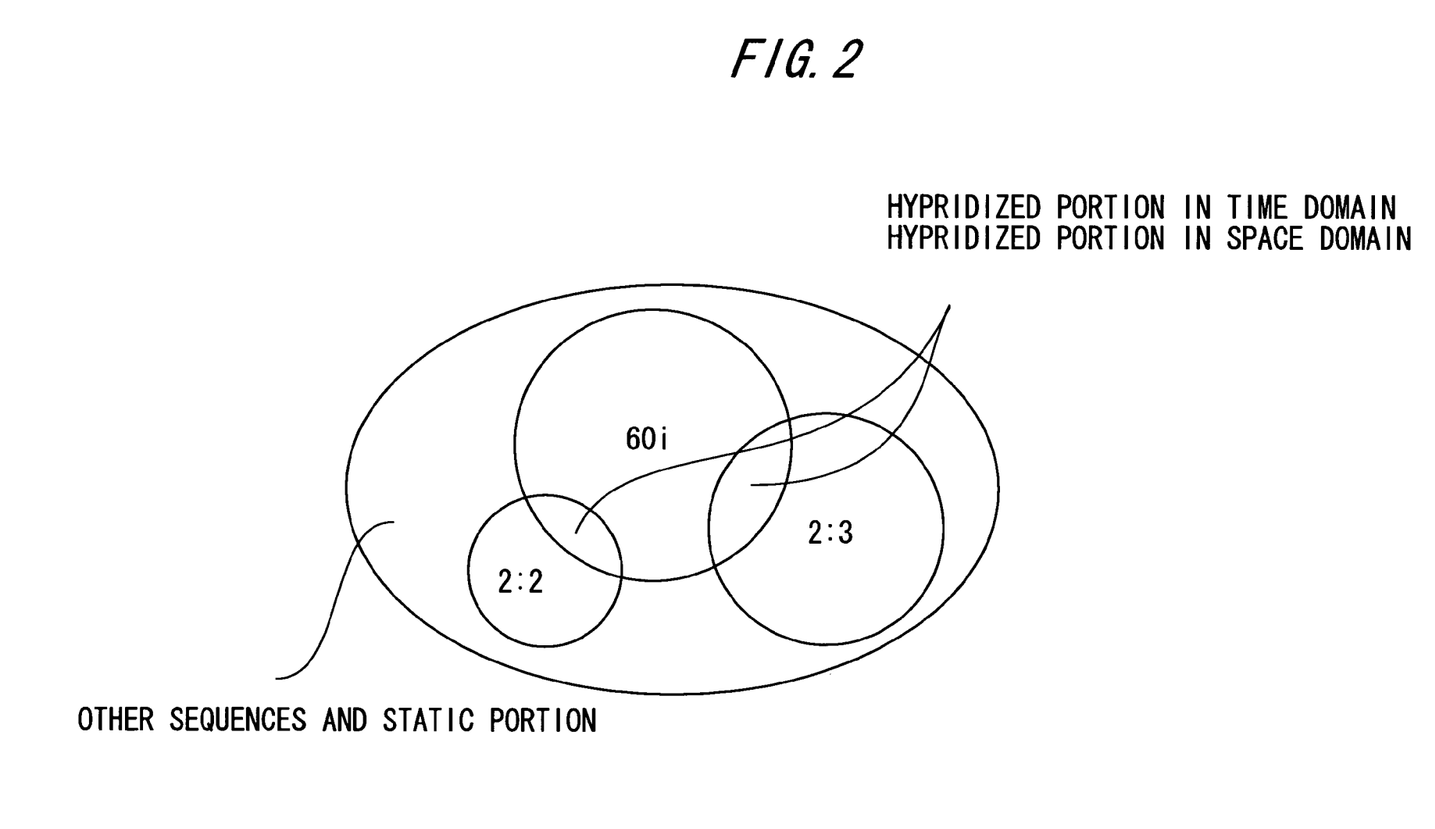
FIG. 2 is a diagram showing categories of video signals.

The real video signals, however, include the video signals that do neither come under the 2:3 pulldown sequence nor the 2:2 pulldown sequence, such as the video signals using the materials having different types of hybridized framerates, the video signals employing modified video transmission sequences and the video signals containing telop composed of a string of moving characters. FIG. 2 shows a schematic diagram when classifying these NTSC video signals.

When categorizing the video signals into the 60i video signals, the telecine-converted 2:3 pulldown video signals and the telecine-converted 2:2 pulldown video signals by individually encircling those signals as in FIG. 2, the video signals using a video transmission sequence other than those are categorized outside these circles. Further, this type of categorization can not be applied to a static picture from the beginning, and hence the video signals composing the static picture are also categorized outside the circles. Moreover, the overlapped portions of the circles each represent a hybridized state of the materials in a time-domain or in a space-domain. For example, this is exemplified by the video signals obtained by synthesizing a background of the CG with a performer captured by 60i signals and the video signals obtained by synthesizing part of 60i signal frames with an advertisement of a movie. Note that these video signals tend to increase as the computers have spread and editing (synthesizing) technologies have been diversified.

Thus, it is difficult to exactly detect the telecine-converted 2:3 and 2:2 pulldown video signals from within the variety of video signals, and misdetection might be considered.

It is to be noted that if, as described above, the picture telecine-converted due to the misdetection is subjected to the interlace-oriented de-interlace process, artifact appear in the picture. By contrast, if the 60i signals undergo the transform type de-interlace process due to the misdetection, it follows the picture is deteriorated to a great degree.

It is therefore required to set the detection condition so that, if anything, the 60i video signals are not misjudged to be the telecine-converted signals.

Accordingly, there exist those undetectable though being the 2:3 pulldown material and the 2:2 pulldown material.

Japanese Patent Application Laid-Open Publication No. 2005-102191 discloses, as the prior art coping with such a problem, a technology of conducting the inverse telecine process on a misdetection-inevitable-basis, then detecting an error by checking a prospective portion from which a problem may arise later on and modifying this portion with the de-interlace process. In the case of this method, the error is detected with difficulty, and the error detecting means is required separately from a video transmission sequence detecting unit, resulting in a complicated configuration of the device.

Such being the case, the present invention was devised to solve the problems and provides a technology capable of conducting the de-interlace process suited to every type of video signals on the occasion of de-interlacing the variety of video signals as carried on the actual broadcasting waves.

The present invention adopts the following configurations in order to solve the problems.

Namely, a converting device according to the present invention comprises a first detecting unit detecting whether or not a result of evaluation as to whether or not inputted interlaced video signals are video signals based on a video transmission sequence, meets a first standard, a second detecting unit detecting whether or not the result of the evaluation meets a second standard, a first converting unit converting, when detecting that the interlaced signals meet the first standard, the interlaced video signals into progressive video signals on the basis of the video transmission sequence, a second converting unit converting, when detecting that the interlaced signals do not meet the first standard but meet the second standard, the interlaced video signals into the progressive video signals on a pixel-by-pixel basis, and a third converting unit converting, when detecting that the interlaced signals meet neither the first standard nor the second standard, the interlaced signals into the progressive video signals.

The second converting unit may select, as respective interpolation pixels of a conversion target field, pixels in positions corresponding to interpolation pixels of neighboring fields anterior and posterior to the conversion target field.

The converting device may further comprise a scene change detecting unit detecting a change of a scene of the video signals, wherein when detecting the change of the scene, the second converting unit may select the pixel from the field on the side continuous to the conversion target field.

The converting device may further comprise an output unit outputting post-conversion progressive video signals. Further, the output unit may selectively output the progressive video signals from any one of the first converting unit, the second converting unit and the third converting unit, corresponding to a result of the detection by the first detecting unit and a result of the detection by the second detecting unit.

The first detecting unit may detect the video transmission sequence from the inputted interlaced video signals.

Further, a converting method by which a converting device executes:

detecting whether or not a result of evaluation as to whether or not inputted interlaced video signals are video signals based on a video transmission sequence, meets a first standard;

detecting whether or not the result of the evaluation meets a second standard;

converting, when detecting that the interlaced signals meet the first standard, the interlaced video signals into progressive video signals on the basis of the video transmission sequence;

converting, when detecting that the interlaced signals do not meet the first standard but meet the second standard, the interlaced video signals into the progressive video signals on a pixel-by-pixel basis; and converting, when detecting that the interlaced signals meet neither the first standard nor the second standard, the interlaced signals into the progressive video signals.

In the converting method, when converting on the pixel-by-pixel basis, pixels in positions corresponding to interpolation pixels of neighboring fields anterior and posterior to the conversion target field, are selected as respective interpolation pixels of a conversion target field.

In the converting method, in the case of detecting a change of a scene of the video signals, when converting on the pixel-by-pixel basis, the pixel is selected from the field on the side continuous to the conversion target field.

In the converting method, post-conversion progressive video signals may be outputted. Further, on the occasion of outputting, the progressive video signals may be selectively outputted from any one of the first converting unit, the second converting unit and the third converting unit, corresponding to a result of the detection by the first detecting unit and a result of the detection by the second detecting unit.

In the converting method, when detecting whether or not the interlaced signals meet the first standard, the video transmission sequence may be detected from the inputted interlaced video signals.

The present invention provides the technology capable of conducting the de-interlace process suited to every type of video signals even in such a case that a difference between the video signals based on the video transmission sequence and the video signals not based on the video transmission sequence, is fuzzy.

DETAILED DESCRIPTION OF THE PREFERRED EMBODIMENT

First Embodiment

The first embodiment is characterized by including a first sequence detector for detecting a sequence such as a 2:2 pulldown sequence and a 2:3 pulldown sequence, a second sequence detector for detecting a semi 2:2 pulldown sequence and a semi 2:3 pulldown sequence in addition to inverse telecine process and de-interlace process for interlace, and a means for executing a progressive process on a pixel selective basis.

Further, the progressive process on the pixel selective basis involves, on the occasion of obtaining interpolation pixels, selecting and outputting, as selection candidate pixels, the pixels of both of fields neighboring to at least an interpolation target field with respect to luminance/chrominance video components.

A best mode for carrying out the present invention will hereinafter be described with reference to the drawings. Configurations in the following embodiments are exemplifications, and the present invention is not limited to the configurations in the embodiments.

Figure 3:
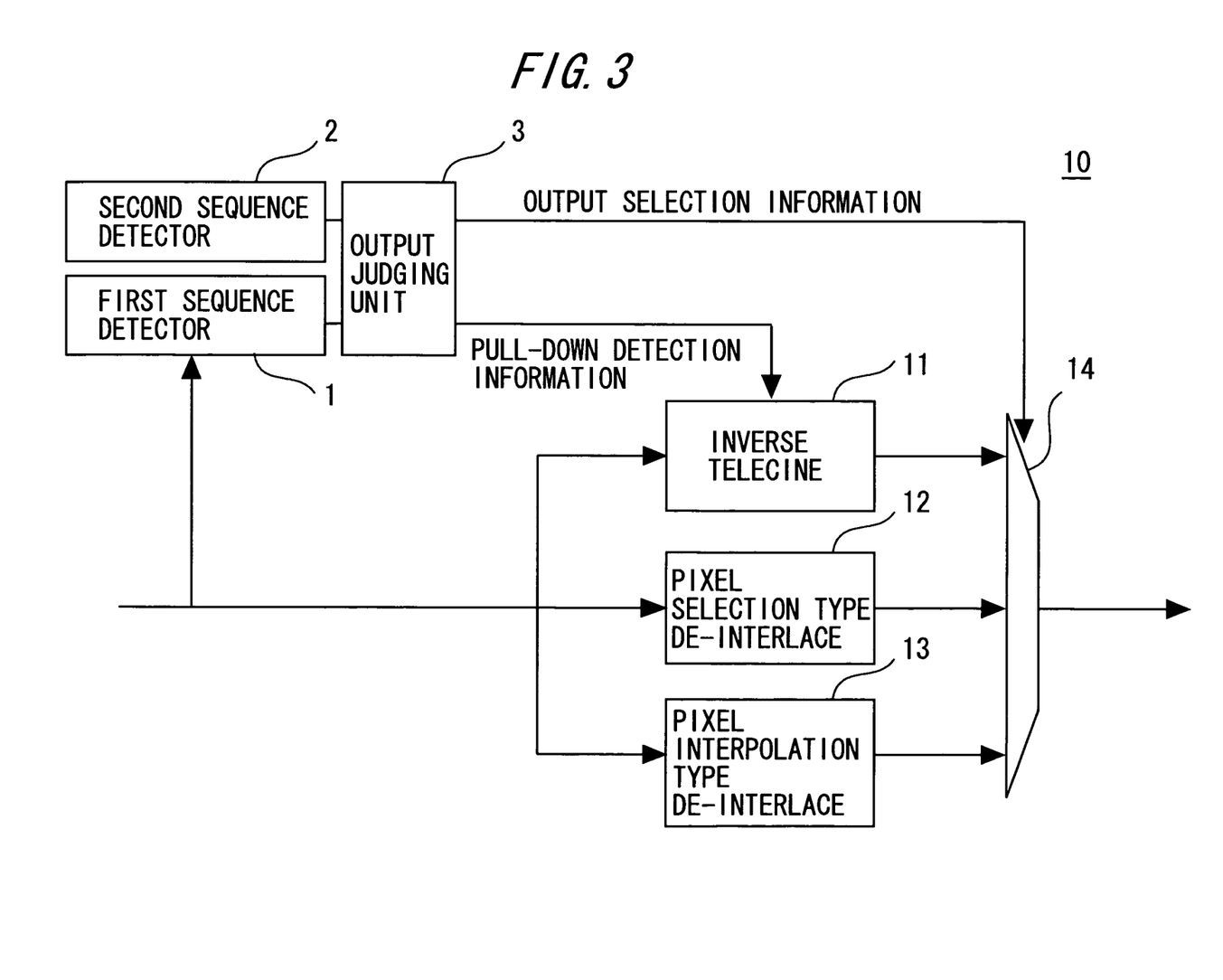
FIG. 3 is a schematic diagram of a converting device in a first embodiment according to the present invention.

FIG. 3 is a diagram schematically showing a configuration of a converting device in the first embodiment. As illustrated in FIG. 3, a converting device 10 in the first embodiment includes a first sequence detector (a first detecting unit) 1, a second sequence detector (a second detecting unit) 2, an output judging unit 3, a inverse telecine unit (a first converting unit) 11, a pixel selection type de-interlacing unit (a second converting unit) 12, a pixel interpolative de-interlacing unit (a third converting unit) 13, and an output unit 14.

The first sequence detector 1 detects as to whether a result of evaluation about whether or not inputted interlaced video signals are video signals based on a video transmission sequence, meets a first standard or not. Moreover, the first sequence detector 1, if the inputted interlaced video signals are the video signals based on the video transmission sequence, detects this sequence and supplies the inverse telecine unit 11 with pulldown detection information.

The second sequence detector 2 detects as to whether the evaluation result meets a second standard or not.

The output judging unit 3 judges, based on a result of the detection by the first sequence detector 1 and a result of the detection by the second sequence detector 2, judges which converting unit 11 or 12 or 13, the progressive signals converted by should be outputted.

The inverse telecine unit 11, when detecting that the interlaced signals meet the first standard, converts the interlaced video signals into progressive video signal based on the video transmission sequence.

The pixel selection type de-interlacing unit 12, when detecting that interlaced signals do not meet the first standard but meet the second standard, converts the interlaced video signals into the progressive video signals on the pixel-by-pixel basis.

Figure 4:
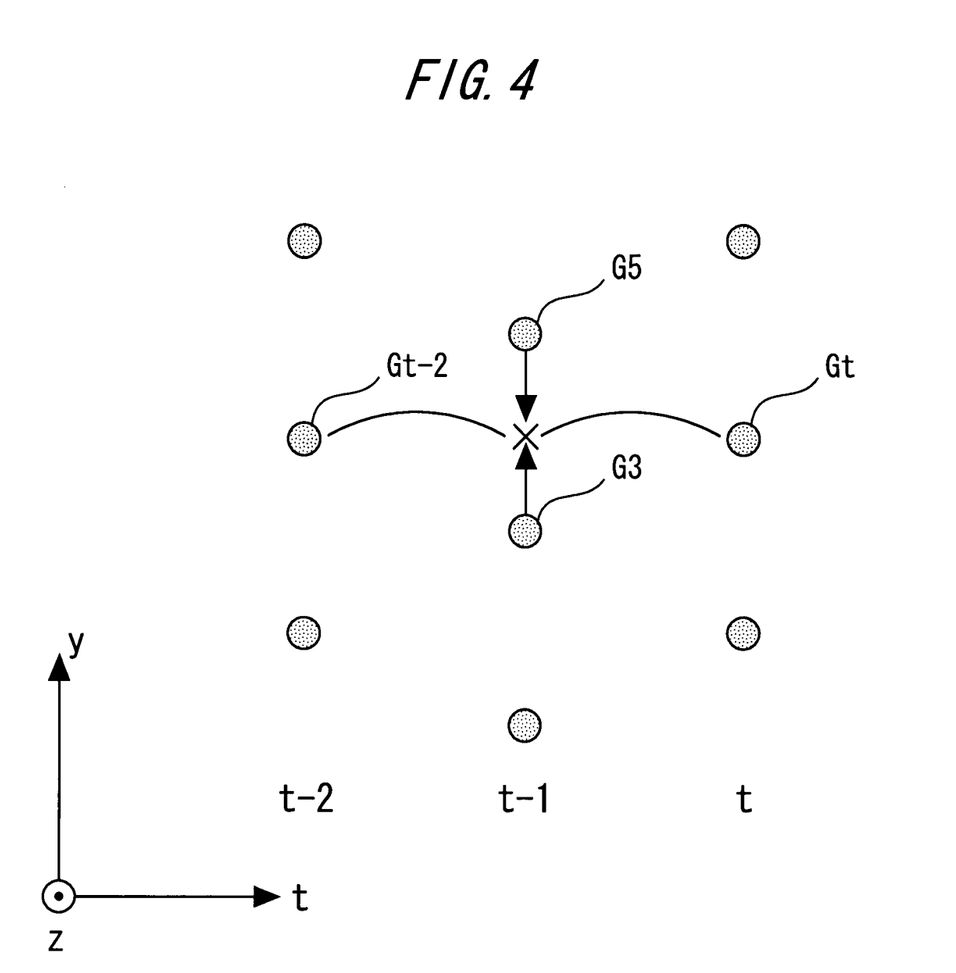
FIG. 4 is an explanatory diagram of a pixel selection type de-interlacing unit.

The de-interlace process in the pixel selection type de-interlacing unit 12 will be explained with reference to FIG. 4. FIG. 4 shows how a t-y plane is seen when cutting three-dimensional video data along horizontal/vertical/time axes (x, y, t) with a certain horizontal coordinate x. Symbols ○ arranged in FIG. 4 represent field data at timings t, t-1 and t-2, and a y-axis-directional deviation of the symbols ○ (pixels) in the neighboring field indicates a difference between an odd-field and an even-field.

The pixel selection type de-interlacing unit 12 in the present example, when interpolating an interpolation pixel (depicted by a mark "X" in FIG. 4) at the timing t-1, selects a proper value of any one of pixels Gt and Gt-2 in a position corresponding to the interpolation pixel in the field at the timing t or t-2 anterior or posterior in time to this interpolation pixel. The pixel selection of Gt or Gt-2 is made based on a value of a pixel G5 or G6 neighboring to each other in the y-axis direction. The frame-originated material (frame material) can be, because of a true pixel being contained in any one of the fields, restored by thus selecting the pixel from the anterior and posterior fields.

The pixel interpolative de-interlacing unit 13, if the interlaced signals meet neither the first standard nor the second standard, i.e., if the interlaced signals are 60i signals, converts the interlaced signals into progressive video signals by a motion adaptive type interpolation process or a motion compensated type interpolation process.

The output unit 14 selects, based on output selection information given from the output judging unit 3, any one of the progressive signals converted in the respective converting units 11, 12 and 13, and thus outputs the selected progressive signal.

Then, the first sequence detector 1, when the interlaced video signals are inputted, compares the respective fields and thus evaluates as to whether the interlaced video signals are video signals based on the video transmission sequence such as the 2:2 pulldown sequence and the 2:3 pulldown sequence. In the present example, as will be explained later on, an evaluation value (a sum of absolute differences) of each field is obtained. Then, if this evaluation value gets less than a first threshold value at a predetermined timing such as conducting the 2:3 pulldown or the 2:2 pulldown, it is detected that the signals meet the first standard, i.e., the signals are the video signals based on the video transmission sequence. Further, a timing when the evaluation value gets equal to or smaller than the first threshold value is defined as information specifying the video transmission sequence, and the pulldown detection information is supplied to the inverse telecine unit 11 on the basis of this information.

Furthermore, the second sequence detector 2, if the evaluation value becomes equal to or larger than the first threshold value and equal to or smaller than the second threshold value at the predetermined timing, it is detected that the signals meet the second standard, i.e., the signals are the video signals pursuant to the video transmission sequence. The "video signals pursuant to the video transmission sequence" are defined as such a type of video signals that a picture, of which the greater part is telecine-converted, partially contains 60i images as in the case of the video signals generated by synthesizing a picture of an advertisement of a movie and a promotion video with 60i signals.

Then, the output judging unit 3 sends to the output unit 14 an output selection signal representing a purport of selecting the signals from the inverse telecine unit 11 if the inputted picture signals meet the first standard, sends to the output unit 14 an output selection signal representing a purport of selecting the signals from the pixel selection type de-interlacing unit 12 if the inputted picture signals meet the second standard, and sends to the output unit 14 an output selection signal representing a purport of selecting the signals from the pixel interpolative de-interlacing unit 13 if the inputted picture signals meet neither the first standard nor the second standard. The output unit 14 selectively outputs the progressive signals from the respective converting units 11, 12, 13 on the basis of the output selection information given from the output judging unit 3.

Thus, the converting device in the first embodiment detects, with the second sequence detector 2, the fuzzy video signals that might be the video signals based on the video transmission sequence or the video signals not based on the video transmission sequence as in the case of the video signals deviating on the verge of its limits from the detection condition (the first standard) of the first sequence detector 1, and then de-interlacing the video signals with the pixel selection de-interlacing unit 12.

With this operation, the first sequence detector 1 may simply detect only the signals defined as the video signals surely based on the video transmission sequence, thereby enabling the detection mechanism to be simplified.

Next, a specific explanation of how the first sequence detector 1 and the second sequence detector 2 make their detections, will be given.

Figure 5:
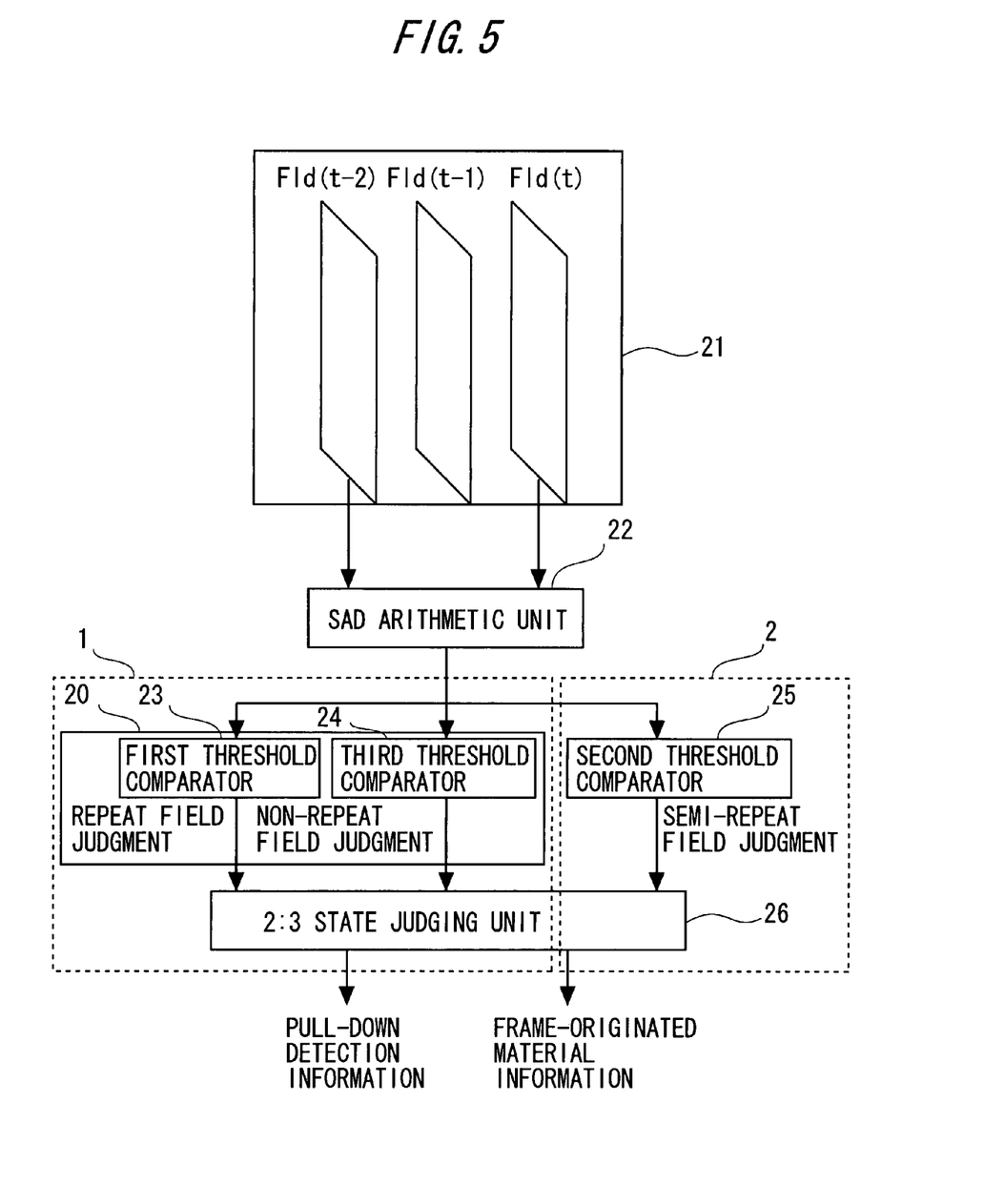
FIG. 5 is an explanatory diagram of a configuration for making a 2:3 pulldown sequence.

FIG. 5 is an explanatory diagram of a configuration for making the 2:3 pulldown detection in the first embodiment. A buffer 21 retains a field Fld(t) at the present timing t and past two fields Fld(t-1), Fld(t-2) at the timings t-1, t-2, and sends the fields Fld(t), Fld(t-2) to the SAD calculator 22. The SAD calculator 22 integrates a difference in pixel value between the fields Fld(t) and Fld(t-2), thereby obtaining a SAD (Sum of Absolute Differences).

A first threshold value comparator 23 of a repeat field candidate judging unit 20 judges a field, of which the SAD value is less than the first threshold value, as a repeat field candidate, and notifies a 2:3 pulldown state judging unit 26 of this field candidate. Further, a third threshold value comparator 24 of the repeat field candidate judging unit 20 judges a field, of which the SAD value is equal to or larger than the third threshold value, as the repeat field candidate, and notifies the 2:3 pulldown state judging unit 26 of this field candidate.

The 2:3 pulldown state judging unit 26 judges from the sequences (timings) in the time-domain of the repeat field and of the non-repeat field whether it is a 2:3 transmission sequence or not, and, if it is the 2:3 transmission sequence, outputs the pulldown detection information based on the sequence of the repeat field.

Further, a second threshold value comparator 25, if the SAD value is equal to or larger than the first threshold value and equal to or smaller than the second threshold value, deems that this is a state having a high possibility of being the frame material (a state having character synthesization and a state showing high noise floor), and notifies the 2:3 pulldown state judging unit 26 of this state. In response to this notification, the 2:3 pulldown state judging unit 26 outputs a selection signal showing a purport of selecting the signals that have undergone the pixel selection type de-interlace process.

Moreover, the 2:3 pulldown state judging unit 26, when transited to a non-2:3 pulldown state from the 2:3 pulldown state, may output a selection signal showing a purport of selecting the signals that have undergone the pixel selection type de-interlace process for a fixed period of time.

Figure 6:
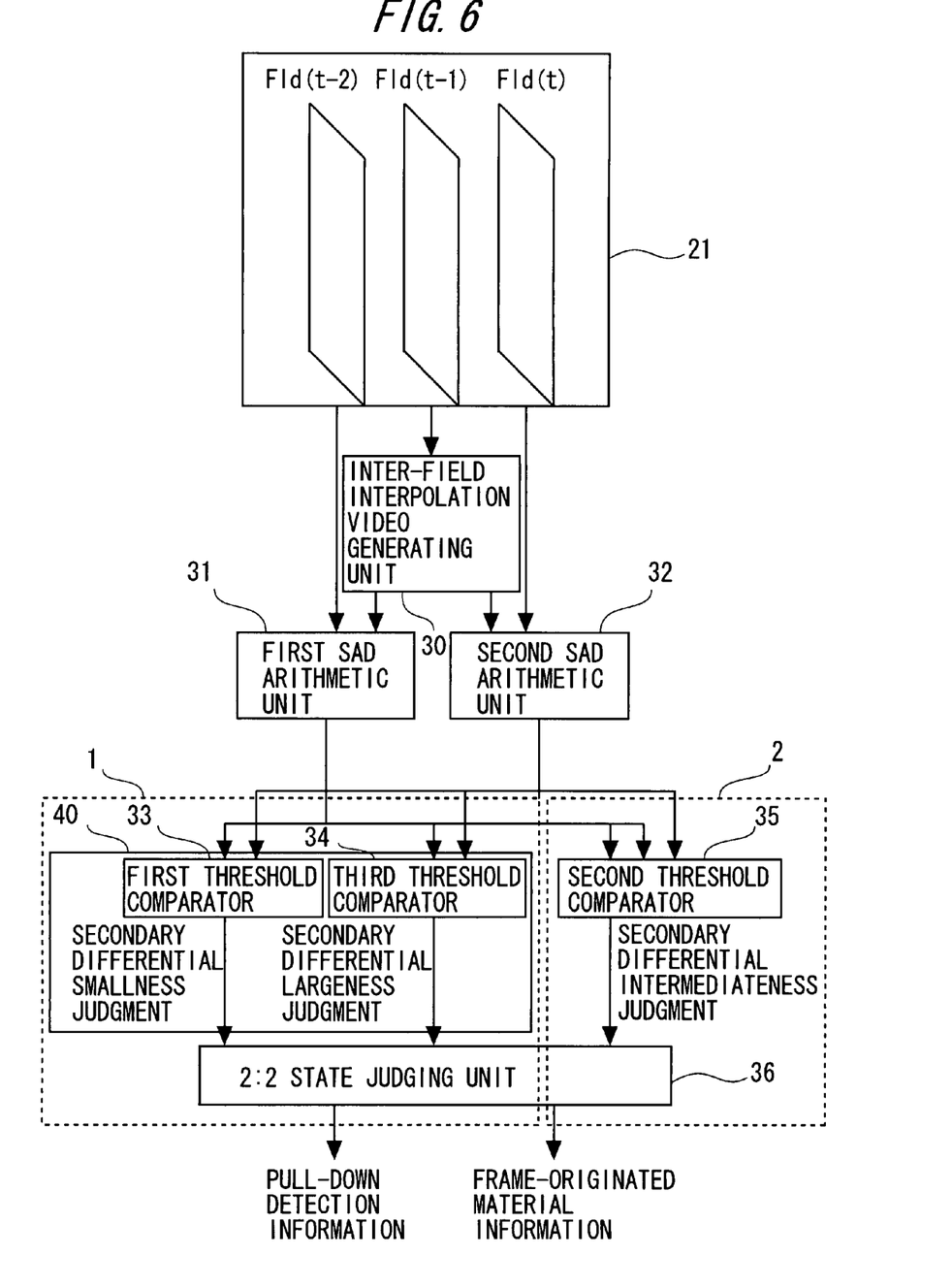
FIG. 6 is an explanatory diagram of a configuration for making a 2:2 pulldown sequence.

FIG. 6 is an explanatory diagram of a configuration for making the 2:2 pulldown detection in the first embodiment. In the case of detecting the 2:2 pulldown sequence, an inter-field interpolation picture (video) generator 30 interpolates a value of the pixel corresponding to the pixel in the neighboring field, and SAD calculators 31, 32 obtain a SAD value of the field Fld(t-1) acquired by this interpolation process and SAD values of the neighboring fields Fld(t), Fld(t-2).

Then, if a difference (secondary differential) between the SAD values obtained by the SAD calculators 31, 32 is less than the first threshold value, a first threshold value comparator 33 of a repeat field candidate judging unit 40 judges that the secondary differential is small, and notifies a 2:2 pulldown state judging unit 36 of this purport. Further, a third threshold value comparator 34 of the repeat field candidate judging unit 40 judges the fields, of which the SAD values are each equal to or larger than the third threshold value, as those showing that the secondary differential is large, and notifies the 2:2 pulldown state judging unit 36 of this purport.

Moreover, if the difference (the secondary differential) between the SAD values obtained by the SAD calculators 31, 32 is equal to or larger than the first threshold value and equal to or smaller than the second threshold value, the first threshold value comparator 33 of the repeat field candidate judging unit 40 notifies the 2:2 pulldown state judging unit 36 that the secondary differential is intermediate.

The 2:2 pulldown state judging unit 36 judges from a magnitude level of secondary differential whether it is the 2:2 pulldown state or not. Further, the 2:2 pulldown state judging unit 36, in the case of the 2:2 pulldown state, outputs pulldown detection information representing a magnitude level sequence, i.e., the repeat field. Moreover, the 2:2 pulldown state judging unit 36, if the secondary differential is intermediate, deems that this is a state having the high possibility of being the frame material, and outputs an output selection signal showing a purport of selecting the signals that have undergone the pixel selection type de-interlace process.

The output judging unit 3, when receiving the pulldown detection information from the 2:3 pulldown judging unit 26 or the 2:2 pulldown state judging unit 36, sends this pulldown detection information to the inverse telecine unit 11, and also transmits, to the output unit 14, the output selection information showing a purport of selecting the progressive video signals from the inverse telecine unit 11.

Moreover, the output judging unit 3, when receiving the output selection signal showing the purport of selecting the signals that have undergone the pixel selection type de-interlace process from the 2:3 pulldown judging unit 26 or the 2:2 pulldown state judging unit 36, transmits this signal to the output unit 14.

Then, the output judging unit 3, in the case of receiving neither the output selection signal showing the purport of selecting the signals that have undergone the pixel selection type de-interlace process nor the pulldown detection information from the 2:3 pulldown judging unit 26 or the 2:2 pulldown state judging unit 36, transmits to the output unit 14 the output selection signal showing the purport of selecting the progressive video signals given from the pixel interpolative de-interlacing unit 13.

In the first embodiment, the two configurations for detecting the 2:2 pulldown sequence and the 2:3 pulldown sequence are provided in parallel by way of the first and second sequence detectors 1, 2, however, the present invention is not limited to these configurations, and configuration for detecting other types of sequences may also be available.

The real video sequences include hard-to-judge materials other than the materials for the 2:2 pulldown sequence and the 2:3 pulldown sequence and also have many switching states thereof, and the conventional method, which must exactly detect any one of states, has a limit. The first embodiment involve executing the progressive synthesization process not on the frame-by-frame basis but on the pixel-by-pixel basis in the situation where it is difficult to judge which state, the 2:2 pulldown state or the 2:3 pulldown state and there is the high possibility of being the frame-based materials such as the 2:3 pulldown and the 2:2 pulldown. With this scheme, the more proper converting process can be selected even with respect to the materials having the hybridized sequences and the materials created by synthesizing the different categories of elements, and, if misjudged, the influence is confined within the vicinity of the pixel, thereby enabling the deterioration of the picture quality to be restrained to the minimum.

Second Embodiment

Figure 7:
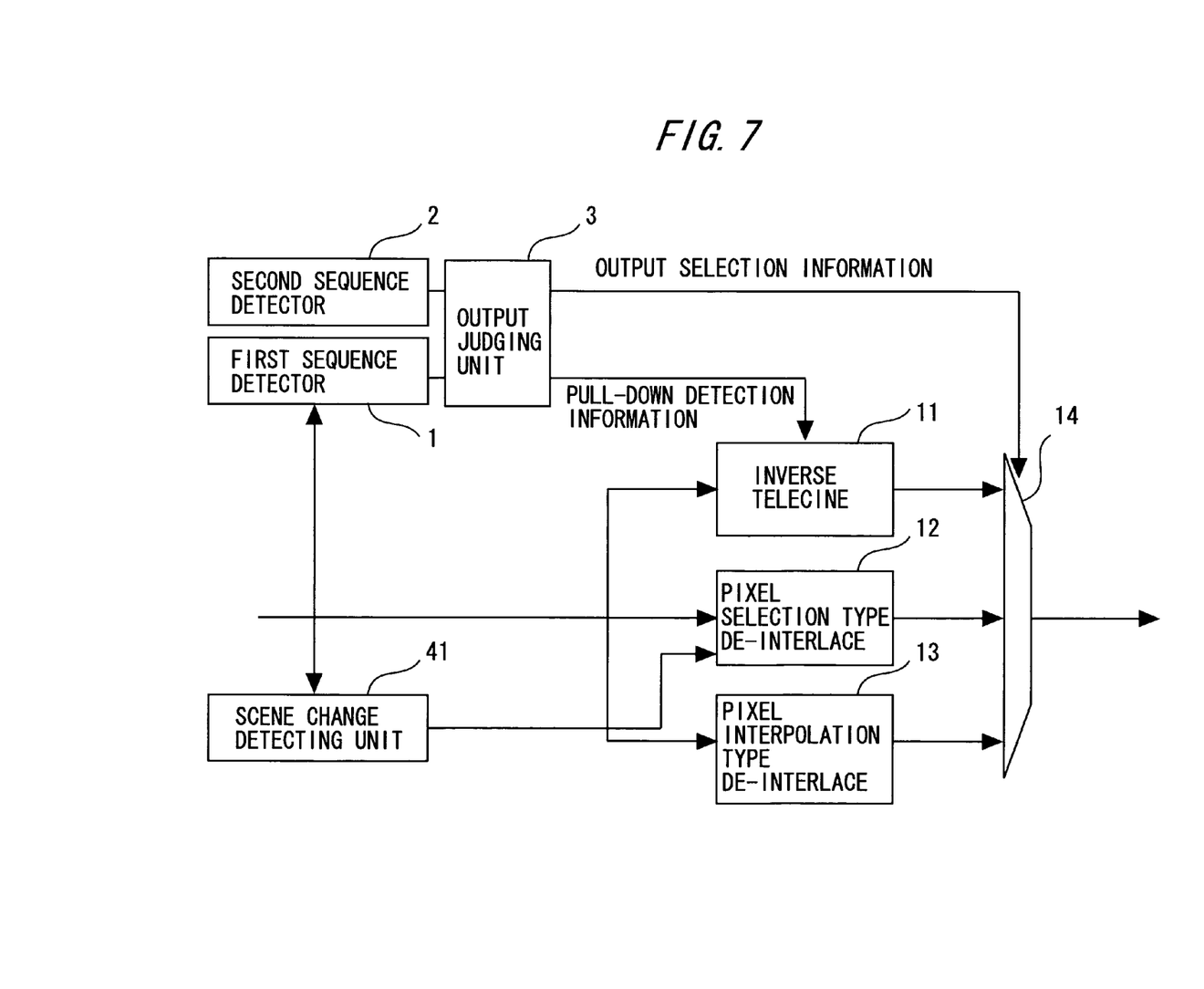
FIG. 7 is a schematic diagram of the converting device in a second embodiment according to the present invention.

FIG. 7 is a schematic diagram of a second embodiment according to the present invention. The second embodiment is different from the first embodiment discussed above in terms of a configuration of further including a scene change detecting unit, wherein the pixel selected by the pixel selection type de-interlacing unit 12 is determined corresponding to a change of scene. Other configurations are the same, and hence the repetitive explanations are omitted in a way that marks the same components with the same numerals and symbols.

A scene change detecting unit 41 sequentially compares the fields of the inputted video signals, then detects, as a change of scene (scene change), a point of time when continuity of a motion of the picture is lost, and notifies the pixel selection type de-interlacing unit 12 of this scene change information. Note that a method of detecting this scene change is a known technology, and therefore its in-depth explanation is omitted.

The pixel selection type de-interlacing unit 12, on the occasion of selecting the pixel in the conversion target field and executing the interpolation process thereon as described above, upon receiving the scene change information, selects the pixel of the field on the side continuous to the conversion target field and executes the interpolation process thereon. Namely, the pixel selection type de-interlacing unit 12, when receiving the scene change information purporting that the conversion target field Fld(t-1) is a discontinuous point of the scene (a tailing field), selects the pixel Gt-2 of the front field Fld(t-2) continuous in scene to the conversion target field Fld(t-1). Further, the pixel selection type de-interlacing unit 12, when receiving the scene change information purporting that the conversion target field Fld(t-1) is a change point of the scene (a leading field), selects the pixel Gt of the rear field Fld(t) continuous in scene to the conversion target field Fld (t-1).

Thus, according to the second embodiment, in addition to the effect in the first embodiment discussed above, the pixel selection type de-interlace process is conducted corresponding to the change of the scene, and hence, when the scene is changed, the progressive process can be executed without any afterimage left.

INCORPORATION BY REFERENCE

The disclosures of Japanese patent application No. JP2006-123457 filed on Apr. 27, 2006 including the specification, drawings and abstract are incorporated herein by reference.

What is claimed is:

1. A converting device comprising:
a first detecting unit detecting that inputted interlaced video signals meet a first standard when a sum of absolute differences gets less than a first threshold value at a predetermined timing, the sum of absolute differences obtained by comparing each of fields of the inputted interlaced video signals;
a second detecting unit detecting that the inputted interlaced video signals meet a second standard when the sum of absolute differences becomes equal to or larger than the first threshold value and equal to or smaller than a second threshold value at the predetermined timing;
a first converting unit converting, when detecting that the interlaced video signals meet the first standard, the interlaced video signals into progressive video signals on the basis of the video transmission sequence;
a second converting unit converting, when detecting that the interlaced video signals do not meet the first standard but meet the second standard, the interlaced video signals into the progressive video signals on a pixel selective basis; and
a third converting unit converting, when detecting that the interlaced video signals meet neither the first standard nor the second standard, the interlaced video signals into the progressive video signals by a motion adaptive type interpolation process or a motion compensated type interpolation process.

2. The converting device according to claim 1, wherein the second converting unit selects, as respective interpolation pixels of a conversion target field, pixels in positions corresponding to interpolation pixels of neighboring fields anterior and posterior to the conversion target field.

3. The converting device according to claim 2, further comprising a scene change detecting unit detecting a change of a scene of the video signals,
wherein when detecting the change of the scene, the second converting unit selects the pixel from the field on the side continuous to the conversion target field.

4. The converting device according to claim 1, further comprising an output unit outputting post-conversion progressive video signals.

5. The converting device according to claim 1, wherein the first detecting unit detects the video transmission sequence from the inputted interlaced video signals.

6. A converting method comprising:
detecting that inputted interlaced video signals meet a first standard when a sum of absolute differences gets less than a first threshold value at a predetermined timing, the sum of absolute differences obtained by comparing each of fields of the inputted interlaced video signals;
detecting that the inputted interlaced video signals meet a second standard when the sum of absolute differences becomes equal to or larger than the first threshold value and equal to or smaller than a second threshold value at the predetermined timing;
converting, when detecting that the interlaced video signals meet the first standard, the interlaced video signals into progressive video signals on the basis of the video transmission sequence;
converting, when detecting that the interlaced video signals do not meet the first standard but meet the second standard, the interlaced video signals into the progressive video signals on a pixel selective basis; and
converting, when detecting that the interlaced video signals meet neither the first standard nor the second standard, the interlaced video signals into the progressive video signals by a motion adaptive type interpolation process or a motion compensated type interpolation process.

7. The converting method according to claim 6, wherein when converting on the pixel-by-pixel basis, pixels in positions corresponding to interpolation pixels of neighboring fields anterior and posterior to the conversion target field, are selected as respective interpolation pixels of a conversion target field.

8. The converting method according to claim 7, wherein in the case of detecting a change of a scene of the video signals, when converting on the pixel-by-pixel basis, the pixel is selected from the field on the side continuous to the conversion target field.

9. The converting method according to claim 6, wherein the post-conversion progressive video signals are outputted.

10. The converting method according to claim 6, wherein when detecting whether or not the interlaced video signals meet the first standard, the video transmission sequence is detected from the inputted interlaced video signals.

* * * * *